Aug. 14, 1956 P. L. PINOTTI 2,758,579
COMPRESSION IGNITION ENGINE FUEL SYSTEM
Filed June 17, 1955 3 Sheets-Sheet 1

INVENTOR
PRIMO L. PINOTTI
BY
ATTORNEYS

Aug. 14, 1956 P. L. PINOTTI 2,758,579
COMPRESSION IGNITION ENGINE FUEL SYSTEM
Filed June 17, 1955 3 Sheets-Sheet 2

INVENTOR
PRIMO L. PINOTTI
BY
ATTORNEYS

Aug. 14, 1956     P. L. PINOTTI     2,758,579
COMPRESSION IGNITION ENGINE FUEL SYSTEM
Filed June 17, 1955     3 Sheets—Sheet 3

INVENTOR
PRIMO L. PINOTTI
BY
ATTORNEYS

United States Patent Office 2,758,579
Patented Aug. 14, 1956

2,758,579

COMPRESSION IGNITION ENGINE FUEL SYSTEM

Primo L. Pinotti, Larkspur, Calif., assignor, by mesne assignments, to California Research Corporation, San Francisco, Calif., a corporation of Delaware Application June 17, 1955, Serial No. 516,071

14 Claims. (Cl. 123—32)

This invention relates to compression ignition engine fuel systems, and particularly to compression ignition engine dual fuel systems capable of supplying a plurality of dissimilar fuels to high and medium speed compression ignition engines; and an object of the invention is to provide novel methods and apparatus to enable high and medium speed compression ignition engines to be operated practicably and efficiently with fuel mixtures in which heavy residual fuel is added to the usual light distillate diesel engine fuel in predetermined fixed or varying proportions in accordance with the varying requirements of engine operation.

This invention contemplates novel methods and apparatus for supplying to a compression ignition engine a plurality of dissimilar fuels, either alternately or as mixtures. By the term "dissimilar fuels" is meant, for example, fuels that are dissimilar in viscosity at a given temperature, or in miscibility, volatility, cetane number, or in any other characteristic by which the fuels may be distinguished. As used herein, the term "residual fuel" or "heavy residual fuel" is intended to include particularly those hydrocarbon fuel oils predominantly comprising hydrocarbons boiling above 600° F., which will generally have a viscosity in Saybolt Seconds Universal (S. S. U.) lying in the range 100–10,000 S. S. U. at 100° F. As used herein, the term "distillate fuel" is intended to include particularly those hydrocarbon fuel oils predominantly comprising hydrocarbons boiling below 600° F., which will generally have a viscosity below 1,000 S. S. U. at 100° F. As used herein, the term "high and medium speed engines" is intended to include generally those compression ignition engines having speeds above 500 R. P. M., for example, the usual railroad diesel engines. As used herein, the term "low speed engines" is intended to include generally those compression ignition engines having speeds below 500 R. P. M., for example, large stationary engines and the usual marine diesel engines.

This invention solves certain dual fuel use problems common to, and is useful in connection with, compression ignition engines operating within all speed ranges, although as the following discussion will show it is particularly useful in connection with high and medium speed compression ignition engines, because it solves certain additional and very important dual fuel use problems of these engines that do not exist, or that are less serious, in low speed engines. For example, because the high and medium speed compression ignition engines generally have smaller bore diameters than the low speed compression ignition engines, it is easier for part of the fuel stream being injected into a cylinder of a high or medium speed engine to traverse the combustion chamber before it is vaporized, espectially if the burning of heavier fuels is attempted, and if complete vaporization does not take place the unvaporized fuel portions cause engine gumming. Also, especially on light loads or at idle, there is more tendency in the high and medium speed engines for the fuel, especially heavier fuel, to fail to vaporize completely, because of the short time the engines allow for vaporization and combustion. As a consequence of the reduced combustion chamber temperature because of the light engine load, and because of the further reduction in temperature due to incomplete vaporization and combustion, these is an increased tendency for the combustion to become quenched. Again, the unvaporized fuel portions cause engine gumming.

Modern high and medium speed compression ignition engines of course vary in design, and even assuming that a heavy residual fuel, or a mixture containing substantial amounts of heavy residual fuel, can satisfactorily be introduced into such compression ignition engines, each type of engine has a practical limit to the proportion of its fuel that can comprise the heavier residual fuel, at various engine loads and speeds. For example, despite treating with cetane number improvers, such as amyl nitrate, ignition improvers, and various other additives, some high and medium speed compression ignition engines, because of their inherent design and operating characteristics, including those that cause the problems discussed in the foregoing paragraph, cannot satisfactorily burn a fuel mixture containing over fifty per cent residual fuel, regardless of the engine load and speed. On the other hand, some high and medium speed compression ignition engines could operate satisfactorily and efficiently, as some speed-load combinations at least, with one hundred per cent residual fuel. Any satisfactory dual fuel system, to be generally applicable to the various types of high and medium speed compression ignition engines desirably should be not only capable of switching from distillate fuel to residual fuel and vice versa, but also capable of blending these two types of fuel in any desired proportions for the needs of the engine at various loads and speeds. Accordingly, it is another object of this invention to provide a dual fuel system, of general applicability to various types of high and medium speed compression ignition engines, as well as to low speed compression ignition engines, that is capable of preparing a mixture of distillate and residual fuels in any desired proportions and supplying it to the engine, and that is further capable of varying the proportions of the mixture as necessary because of varying requirements of engine operation.

Desirably, a compression ignition engine dual fuel system in addition to being capable of continuously preparing and supplying to a compression ignition engine a fuel mixture of distillate and residual fuel in such proportions that the mixture can be continuously burned by the engine, should embody means to eliminate the deleterious effects to the engine that would normally result from the basic incompatibility of the two types of fuels. The phenomenon of incompatibility causes two fuels, each stable by itself, to become instable when blended. The result of the incompatibility instability is to cause certain relatively insoluble materials in one or both fuels to drop out of solution or suspension when the two fuels are mixed, probably as a result of the resultant lower solubility of the mixture as compared with the fuel or fuels containing the said materials. The precipitate materials cause serious harm to a compression ignition engine in various ways, for example, they cause including increased engine wear, fuel filter clogging and fuel injector sticking. The incompatibility problem can occur when two different types of distillate fuels are involved, although it can be coped with to some extent by various types of dispersant and stability-incompatibility additives. However, when mixtures of distillate and residual fuels are prepared, the greater quantities of insoluble materials originating from the residual fuel cause the problem to be even more serious, and a satisfactory dual fuel system for compression ignition engines should include a solution to this problem. Accordingly, it is another object of this invention to provide a dual fuel system for supplying a mixture of two incompatible fuels to a compression ignition egine in which the normal tendency of insoluble materials to precipitate out upon mixing of the two fuels is counteracted and the insoluble materials are kept in solution or suspension in a localized area until the mixture is burned.

Another of the problems that heretofore has militated against burning of residual fuels in high and medium speed compression ignition engines, either mixed with distillate fuel, or as an alternate supply to be switched to after the engine has been started on distillate fuel, is the problem of preventing uneven thermally-caused expansion and contraction of injectors and pump valves with resulting scoring and subsequent part failure, when switching from a fuel or mixture of one temperature to one of another temperature. There is little need to heat the universally used distillate fuels, except perhaps under extreme operating conditions, because of their usual fluidity characteristics. On the other hand, the higher viscosity of residual fuels precludes their satisfactory injection into the engines at the lower temperatures that are satisfactory for injection of the distillate fuels, because at low residual fuel temperatures the incomplete vaporization problem previously referred to is much more serious and because residual fuel at the lower temperatures impedes satisfactory engine and pump valve operation. The component parts of the injectors and pump valves operate on such close mating tolerances that the operating temperatures of these injectors and valves are critical. When they are constructed and adjusted for satisfactory operation with the unheated distillate fuels, the addition to the distillate fuel of significant quantities of heated residual fuel can easily cause uneven thermal expansion of the component parts of the injectors and pump valves to the point where the injectors and related pumps operate unsatisfactorily or not at all, because of scoring, sticking and jamming. The problem is even more difficult when a simple switch-over from one hundred per cent unheated distillate fuel to one hundred per cent heated residual fuel is considered. The heating capacity necessary to solve the problem by heating both the distillate and residual fuel to the common temperature necessary for the residual fuel generally has been found to be undesirable. The problem is further complicated by the incompatibility and instability problems referred to above, which problems arise immediately if the two fuels are placed together to be heated. Accordingly, a further object of this invention is to provide a practicable dual fuel system for high and medium speed compression ignition engines, as well as for low speed compression ignition engines, in which the injectors and related pumps of the engines will not be subjected to thermal changes that will cause them to become partially or wholly inoperative.

Another problem that is inherent in any consideration of a dual fuel system for compression ignition engines is that of securing a uniform mixture of distillate and residual fuels. Closely allied to this problem is the problem of purging the various lines and chambers in the system of one fuel or fuel mixture when engine operating conditions require a transition to a different fuel or fuel mixture. In the case of such a transition it would be obviously undesirable to have accumulations of pockets of the first fuel or fuel mixture left in the system, especially in the region of the intake to the engine fuel injectors. Such accumulations or pockets could be drawn into at least some of the injectors, resulting in the engine attempting to burn the wrong fuel or fuel mixture for given conditions of speed and load. At best, uneven and inefficient engine performance would result. Accordingly, it is another object of this invention to provide a dual fuel system for compression ignition engines in which a transition can be made from a given fuel or fuel mixture to another fuel or uniformly mixed fuel mixture without undesirable accumulations or pockets of the first fuel or fuel mixture remaining in the system.

The demand for fuels for compression ignition engines has been increasing rapidly for some time, and the increase is expected to continue. The universal acceptance of diesel-electric power by railroads accounts for much of this increase in demand. The various types of railroad diesel engines and other high and medium speed compression ignition engines, by virtue of their inherent characteristics, exhibit a pronounced preference for the higher grade distillate fuel fractions distilling between gasoline and residual fuel oil. Thus far there has been no satisfactory means for running these compression ignition engines on the heavier residual fuel oils, or even on mixtures containing significant quantities of these heavier oils. The failure thus far to develop satisfactory means for utilizing at least some significant amounts of residual fuel oils in these engines is evidenced by the fact that railroad diesel engines and similar high and medium speed compression ignition engines until now have been operated substantially entirely on the lighter and more expensive distillate fuels, at all loads and all throttle settings. Because the total increase in demand for fuels for compression ignition engines has been in a large part due to the increased demand for the lighter distillate fuels, refiners have been forced to increase the "per barrel" yield of middle-distillate fuel, i. e., the "middle-of-the-barrel" fraction distilling between gasoline and residual fuel oil. This increase has been made at the expense of the "per barrel" yield of the heavier residual fuel. It has been estimated that diesel fuel accounts for over fifty per cent of the cost of operating a railroad diesel-electric engine in freight service, the most important service from the standpoint of fuel usage. Therefore, it would be desirable from the railroads' standpoint to be able to operate diesel engines on the less expensive residual fuels, or on mixtures containing substantial amounts of these less expensive fuels, provided that the savings in fuel costs were not nullified by prohibitive initial increased engine costs and by resulting increased continuing costs in other directions, such as possible increased costs caused by increased engine wear, increased lubricating oil costs, and increased labor costs. With the foregoing background in mind, it is a general object of the present invention to provide a dual fuel system whereby high speed and medium speed compression ignition engines, as well as low speed compression ignition engines, may be operated with fuel mixtures in which substantial amounts of heavy residual fuel have been added to the usual light distillate compression ignition engine fuel, and without a resultant prohibitive increase in initial engine costs and in increased continuing costs.

The foregoing objects and others ancillary thereto I prefer to accomplish as follows: According to one preferred embodiment of my invention I provide in connection with a supply of residual fuel and a supply of distillate fuel at least one header chamber or manifold communicating through the engine injectors to the combustion chambers of the engine. I also provide means for heating the residual fuel, means for conditioning the residual fuel, means for continuously preparing a mixture of any desired proportions of the distillate fuel and the heated and conditioned residual fuel and means for pumping the mixture into the header chamber prior to burning. By "conditioning" I mean mechanically reducing the sizes of the particles of the residual fuel. It has been found that the reduced fuel particle size allows better vaporization and improved combustion of the residual fuel and thereby reduces the rate of formation of deposits, including carbon deposits, on fuel injector nozzles, on piston rings, and on piston ring lands, with a resulting reduction in the rate of engine wear. I further provide means for varying the proportions of the mixture as made necessary by engine operating conditions, and means for continuously circulating the mixture through the header chamber to keep the mixture in an agitated or turbulent condition until it is burned. By making the header chamber of as small a capacity as is consistent with fuel consumption requirements of the engine, I reduce to a minimum the heating capacity that is necessary to maintain the mixture in the header at the proper temperature, and I reduce to a minimum the time required for the mixture in the header to assume new proportions after the engine controls have been manipulated to secure the new proportions. Because of the small capacity of the header and piping through which the mixture in the header is continuously circulated, I successfully combat the inherent incompatibility of residual and distillate fuels by reducing to a minimum the time between mixing and burning. Any incompatibility effects that do have a chance to come into play are further minimized by the agitated or turbulent condition of the continuously circulating mixture, which tends to hold in suspension until burned, any insoluble materials that tend to precipitate out because of the inherent incompatibility of the two fuels.

The novel features that I consider characteristic of my invention are set forth with particularity in the appended claims. The invention will be better understood, however, both as to its organization and method of operation, and further objects and advantages of the invention will be apparent, from the following detailed description of specific embodiments when read in connection with the accompanying drawings, in which:

Figure 1:
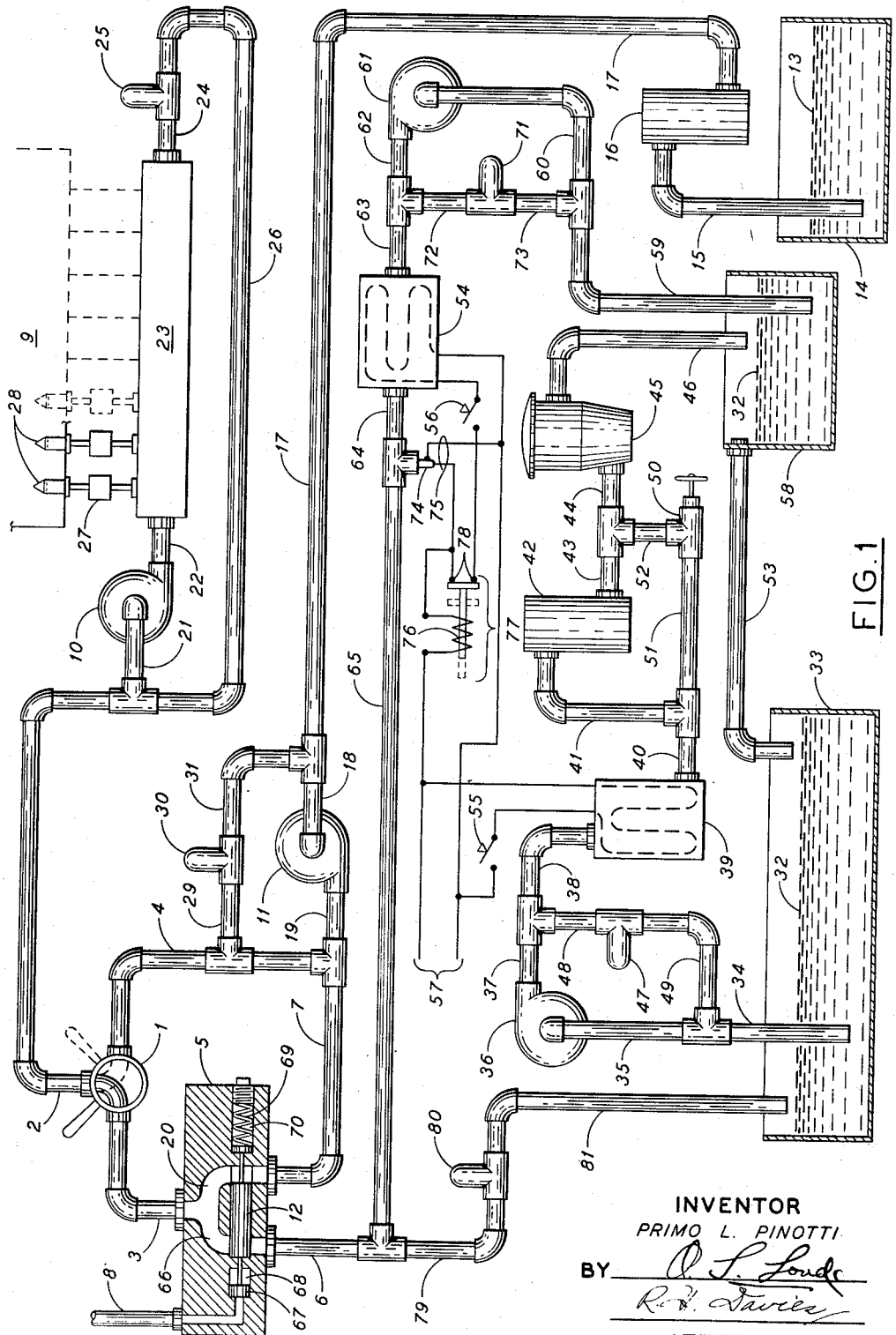
Fig. 1 is a schematic diagram of one preferred embodiment of the invention, as used in conjunction with necessary fuel sources and with desirable engine components and equipment, including a fluid circulating header and a proportioning valve for varying the fuel mixture uniformly over the range of desired mixtures, rather than in steps.

Referring now to Fig. 1, one preferred embodiment of the present invention is shown as it might be installed and operated on a diesel electric railroad locomotive. The operation of this preferred embodiment is as follows:

Compression ignition engine 9, residual fuel tank 33 and distillate fuel tank 14 are shown connected for supplying various proportions of distillate fuel 13 and residual fuel 32 to diesel engine 9 through proportioning valve 5, header 23 and fuel injectors 28.

The handle of 3-way manual valve 1 may be manually set in the position shown by solid lines in which case it will allow fuel to pass to pipe 2 from pipe 3, but not from pipe 4. Alternatively, it may be manually set in the position shown by dotted lines to allow fuel to pass to pipe 2 from pipe 4, but not from pipe 3. Proportioning valve 5 is so constructed that it may be actuated to accept, for entry into pipe 3, all the fuel arriving at said valve through pipe 6 and none of the fuel arriving at said valve through pipe 7, or vice versa, or any intermediate proportions of the two fuels so arriving. Proportioning valve 5 may be manually or electrically actuated, or it may be air actuated as shown in Fig. 1. In the electrically or air actuated situations, the actuating means, for example the control air supply shown arriving at proportioning valve 5 through pipe 8, is so interlocked with the throttle of diesel engine 9 that at the time of starting of diesel engine 9, only distillate fuel will be accepted by proportioning valve 5 for entry into pipe 3. It will be obvious to those skilled in the art that other proportioning means, such as a proportioning pump, may be used in lieu of proportioning valve 5, and that the control air supply to proportioning valve 5 may be interlocked with the governor of diesel engine 9 instead of with the throttle, or it may be interlocked with other speed or load responsive components of diesel engine 9.

With manual valve 1 set in the position shown by solid lines, diesel engine 9 is started by conventional starting means not shown in the drawing, after circulating pump 10 and fuel transfer pump 11 have been started. Both pump 10 and pump 11 are driven by electrical motors, not shown in the drawing, and both are started by conventional starting means, also not shown in the drawing. Relief valve 30 serves to protect pump 11 against excessive discharge pressures and is set to open at a predetermined pressure, for example 35 p. s. i., and allow pump 11 to pump distillate fuel 13 through pipes 29 and 31, which it will do when complete or partial closure of passageway 20 by piston 12 causes the discharge pressure of pump 11 to rise above the pressure at which relief valve 30 is set. Upon starting of diesel engine 9, piston 12 of proportioning valve 5 will be in the position shown in the drawing because of the interlocking of the control air supply with, for example, the throttle or governor of diesel engine 9. Therefore, fuel transfer pump 11 will pump distillate fuel 13 from distillate fuel tank 14 through pipe 15, filter 16. pipes 17 and 18, pump 11, pipes 19 and 7, passageway 20 in proportioning valve 5, pipe 3, 3-way manual valve 1 when the handle thereof is in the normal, automatic position shown in the drawing by solid lines, pipe 2, and thence into the closed loop circulating system comprising pipe 21, circulating pump 10, pipe 22, header 23, pipe 24, relief valve 25, and pipe 26. In the said closed loop circulating system, circulating pump 10 keeps all fuel entering the closed loop in continuous circulation in an agitated or turbulent condition through header 23 against the back pressure of relief valve 25, which valve is selected and adjusted to maintain about 25 p. s. i. a. in header 23 to prevent engine fuel starvation at full load. It will be apparent that other means of maintaining the fuel or fuel mixture in an agitated or turbulent condition could be used in lieu of the closed loop circulating system, for example, any means could be used that will give a continuous mixing action to the mixture, such as a continuously agitated tank or a tank containing moving vanes for continuous fuel agitation. From header 23 a plurality of injector pumps 27 pump fuel through a plurality of injectors 28 into diesel engine 8 in amounts determined by the throttle setting and load and governor conditions of diesel engine 9.

With diesel engine 9 running on distillate fuel 13 as described above and with manual valve 1 set in the position shown by solid lines, residual fuel 32 will be gradually and automatically blended with distillate fuel 13 in increasing proportions as the speed of engine 9 increases as follows:

Before operating diesel engine 9, electric immersion-type heaters 39 and 54, both 75 volt 5-pass heaters, will have been energized from voltage source 57 by closing manually operated switches 55 and 56 respectively. The purpose of heater 39 is to raise the temperature of residual fuel 32 to an operating temperature satisfactory for its flow through filter 42 and fuel conditioner 45, which temperature may be approximately 200° F. The purpose of heater 54 is to raise the temperature of residual fuel 32 to approximately 230° F. at which temperature the viscosity of a residual fuel 32 with a viscosity of 6500 S. S. U. at 100° F. will be approximately 100

S. S. U. The residual fuel viscosity is thus reduced by heat to the approximate order of magnitude of the unheated distillate fuel. It will be apparent to those skilled in the art that many other means for heating the residual fuel are possible, for example hot water coils supplied with heat from diesel engine 9.

Fuel transfer pump 36 will pump residual fuel 32 from residual fuel tank 33 through pipe 34, pipe 35, pump 36, pipes 37 and 38, electric heater 39, pipes 40 and 41, filter 42, pipes 43 and 44, fuel conditioner 45 and pipe 46, from which fuel 32 flows by gravity into de-aerating tank 58. Fuel transfer pump 36 is a gear-type pump rated at 180 gallons per hour. It is protected against excessive discharge pressures by relief valve 47 set to open at 35 p. s. i., above which pressure pump 36 will pump residual fuel 32 through pipes 48 and 49. Filter 42 may be a single element, long cotton fiber, sock-type and serves to relieve fuel conditioner 45 of load caused by accumulating dirt and other foreign matter. Manual bypass valve 50 serves to bypass residual fuel 32 around filter 42 through pipes 51 and 52 in the event of excessive pressure drop across filter 42.

Fuel conditioner 45 comprises means, which may be centrifugal separating means, for removing from residual fuel 32 foreign matter not removed by filter 42, and means for mechanically reducing the sizes of the particles of residual fuel 32. As previously pointed out, it has been found that the reduced fuel particle size allows better vaporization and improved combustion of residual fuel 32 and thereby reduces the rate of formation of deposits, including carbon deposits, on injection nozzles of injectors 28 and on piston rings and ring lands of diesel engine 9 with a resulting reduction in the rate of engine wear. Various means may be used in fuel conditioner 45, or separately, for mechanically reducing the fuel particle size, for example, a second centrifugal device in series with the centrifugal separating means, crystals of various materials dispersed in the fuel and sonically vibrated, or various types of mechanical homogenizers.

De-aerating tank 58 serves to allow the air entrained in residual fuel 32 in its passage through fuel conditioner 45 to become disengaged from residual fuel 32. De-aerating tank 58 is suitably vented to the atmosphere in a manner that will insure that the hot gases escaping from heated residual fuel 32 are thoroughly cooled and dispersed before they reach the atmosphere, thereby preventing explosion hazards. Overflow outlet pipe 53 serves to return to residual fuel tank 33 any excess in residual fuel 32 delivered to de-aerating tank 58 through pipe 46 over that which is removed through pipe 59. The overflow of heated residual fuel 32 through pipe 53 to residual fuel tank 33 serves to add heat energy to residual fuel 32 in residual fuel tank 33 and thereby reduces the amount of heat energy which must be supplied to residual fuel 32 by heater 39. From de-aerating tank 58 conditioned residual fuel 32 is pumped by fuel transfer pump 61 through pipes 59 and 60, pump 61, pipes 62 and 63, electric heater 54, pipes 64, 65 and 6, and, when the position of piston 12 allows communication between pipe 6 and passageway 66, into passageway 66 of proportioning valve 5. So long as such communication exists, relief valve 80, which is set at 40 p. s. i., prevents flow of residual fuel from pipe 65 through pipe 79, relief valve 80, pipe 81 and back to residual fuel tank 33. As the speed of diesel engine 9 increases, the increased pressure of air supply 8 which is interlocked with the throttle, governor, or other speed or load responsive component of diesel engine 9, will act on auxiliary piston 67 which operates in chamber 68 of proportioning valve 5, and auxiliary piston 67 will force main piston 12 to move against the pressure of spring 69 in chamber 70. As piston 12 moves against the pressure of spring 69 in proportion to the increase in air pressure of air supply 8, the effective cross-sectional area of passageway 20 will be decreased and the effective cross-sectional area of passageway 66 will be proportionately increased. As the movement of piston 12 allows a communication between pipe 6 and passageway 66, residual fuel 32 will be forced from pipe 6 through passageway 66 of proportioning valve 5 and thence through pipe 3, manual valve 1, pipe 2, and into the closed loop circulating system comprising pipe 21, pump 10, pipe 22, header 23, pipe 24, relief valve 25 and pipe 26. Proportioning valve 5 will blend distillate fuel 13 and residual fuel 32 in any proportions depending upon the pressure of air supply 8. The mixture of the two fuels entering the said closed loop circulating system through pipe 2 will be continuously circulated in that closed loop by circulating pump 10 and that the turbulent condition of this circulation will minimize the incompatability effects that exist between distillate fuel 13 and residual fuel 32. Relief valve 71 serves to protect pump 61 against excessive discharge pressures and is set to open at 50 p. s. i. and allow pump 61 to pump residual fuel 32 through pipes 72 and 73, which it will do when complete or partial closure of passageway 66 by piston 12, or clogging in heater 54, or both, causes the discharge pressure of pump 61 to rise above the pressure at which relief valve 71 is set.

Thermostat 74 serves to limit the temperature of residual fuel 32 entering proportioning valve 5 to approximately 265° F., and thus to prevent overheating of valves, injector pumps, injectors, etc., by operating at that temperature to close circuit 75 and energize coil 76 of relay 77 from source 57, thereby causing relay 77 to open its contacts 78 and disconnect heater 54 from source 57.

In the event of any disturbance or malfunctioning in the residual fuel components of the above-described dual fuel system, the handle of 3-way manual valve 1 simply may be moved to the position shown by dotted lines in Fig. 1, and thereupon diesel engine 9 will be supplied by distillate fuel only. In such a case circulating pump 10 will serve to circulate and blend the incoming distillate fuel in header 23 with the remaining fuel mixture still being circulated in header 23 at the time of switch-over, and thus a gradual rather than an abrupt fuel transition is effected.

The foregoing preferred embodiment of the present invention operates to automatically and uniformly vary the proportions of residual and distillate fuel in the blended fuel mixture. It will be apparent to those skilled in the art that the interlock of air supply 8 with, for example, the throttle or governor of diesel engine 9 can be varied to automatically provide different fuel blends for any given loads and speeds, in accordance with the needs of the engine in which the invention is incorporated.

It will be further apparent to those skilled in the art that the said interlock may be arranged, if so desired, so that proportioning valve 5 will operate simply in an "on-off" manner, for example to automatically switch from 100% distillate fuel to 100% residual fuel at, say, 25% of full engine speed. For a given engine capable of burning 100% residual fuel at some load-speed combinations, such an arrangement may be desirable, and in fact, has been installed and satisfactorily operated on a Baldwin Lima Hamilton 1500 horsepower (for traction) diesel electric, six axle, six motor road switcher diesel electric railroad locomotive. Test data from actual tests made on this locomotive operating with this arrangement of the present invention are plotted in Figures 2 and 3, both of which figures embody curves developed by running the engine on both 100% of a particular type of residual fuel and 100% of a particular type of distillate fuel. These figures both illustrate various advantages made possible by this invention that heretofore have been unattainable in high and medium speed compression ignition engines because heretofore their attainment has been precluded by prohibitive engine wear and other factors previously discussed.

Figure 2:
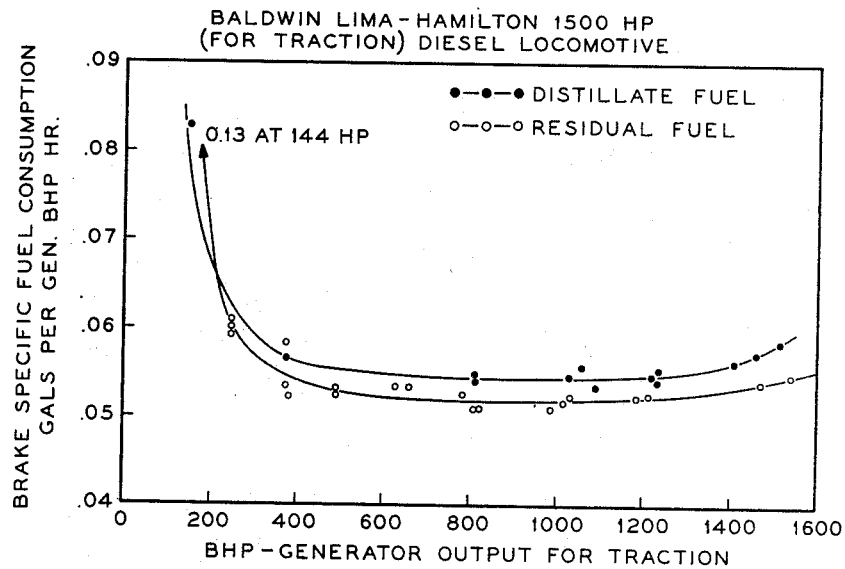
Fig. 2 is a graph indicating the relation between brake specific fuel consumption and generator output for traction for both a particular distillate fuel only and a particular residual fuel only, for a particular railroad diesel locomotive on which this invention has been installed and tested, plotted from actual test data.

Referring now to Fig. 2, one of the two curves shown resulted from running the engine on 100% distillate fuel, and the other curve resulted from running the engine on 100% residual fuel. It may be seen from a comparison of these two curves that over all of the range of generator output, except about 200 B. H. P. and below, it was advantageous from a fuel use standpoint to be able to burn 100% residual fuel. It it true that residual fuel is lower in heating value on a weight basis than distillate fuel, but it is higher in heating value on a volume basis, so that most values of generator output can be obtained with fewer gallons per hour of residual fuel than of distillate fuel. However, a comparison of the two curves will also indicate that in the generator output range below about 200 B. H. P. it was advantageous from a fuel use standpoint to be able to burn 100% distillate fuel, because in this range fewer gallons per hour of distillate fuel than of residual fuel were required for the same generator output. Thus, by enabling switching from residual to distillate fuel, as desired, without prohibitive resulting engine wear, this invention enables the foregoing fuel use advantages of Fig. 2 to be obtained.

Figure 3:
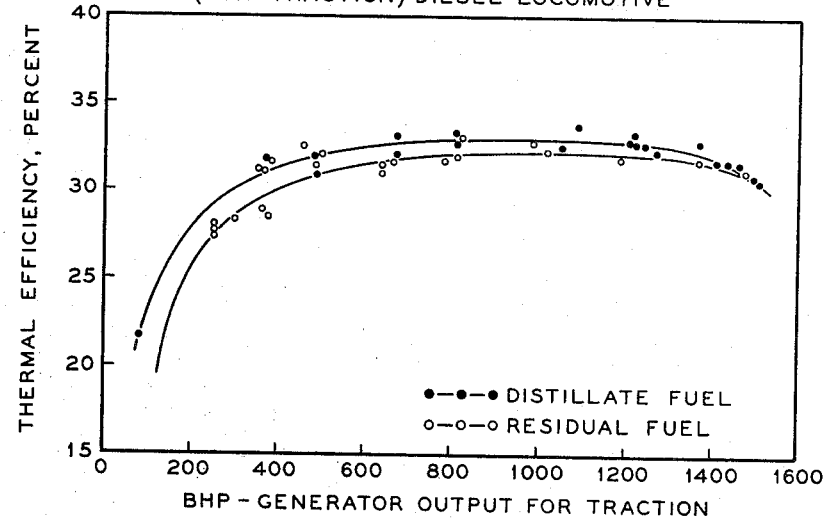
Fig. 3 is a graph of actual test data on the same railroad diesel engine embodying this invention, indicating the relation between engine thermal efficiency and generator output for traction for both a particular distillate fuel only and a particular residual fuel only.

Referring now to Fig. 3, one of the two curves shown resulted from running the engine on 100% distillate fuel, and the other curve resulted in running the engine on 100% residual fuel. It may be seen from a comparison of these two curves that the thermal efficiency of the engine was higher on 100% distillate fuel than on 100% residual fuel over most of the range of generator output except the very highest loads. However, it may also be seen that over most of the range of generator output the engine thermal efficiency was only slightly higher with distillate fuel than with residual fuel, and only became markedly higher in the very low generator output ranges below about 200 B. H. P. For example, the curves indicate that the engine thermal efficiency on distillate fuel compared with the engine thermal efficiency on residual fuel was only higher by approximately 1% or less from 500 B. H. P. to 1500 B. H. P., and was only higher by 1½% at 300 B. H. P. Only when the B. H. P. dropped to about 200 did the distillate fuel begin to result in markedly higher engine thermal efficiency, for example with 100% distillate fuel the engine thermal efficiency at 140 B. H. P. generator output was about 4% higher than the engine thermal efficiency with 100% residual fuel. The foregoing discussion of Fig. 3 indicates that in switching from distillate to residual fuel for generator outputs above approximately 200 B. H. P., as indicated by the curves of Fig. 2 to be desirable from a fuel use standpoint, there was not a prohibitive decrease in engine thermal efficiency. Further, at generator outputs below about 200 B. H. P., when the engine thermal efficiency began to be markedly lower on residual fuel than on distillate fuel, the curves of Fig. 2 indicate that it was advantageous from a fuel use standpoint to be operating the engine on distillate fuel anyway.

The foregoing discussion of Figures 2 and 3 indicates that it is advantageous to be able to satisfactorily switch a compression ignition engine from distillate fuel to residual fuel, and vice versa, as desired. Heretofore such switching resulted in prohibitive engine wear and the indicated advantages were unattainable as a practical matter. For example, prior to the installation of the above-discussed arrangement of this engine on the above-mentioned locomotive, attempts were made to switch from distillate to residual fuel, and vice versa, without using the invention. Upon switching from unheated distillate fuel to heated residual fuel the plungers of the fuel injector pumps tended to freeze immediately in their bushings. Upon immediate dismantling without further engine operation the plungers of the fuel injector pumps were found to be heavily scored and otherwise damaged because of the uneven thermally caused expansion of the metal parts of the fuel injectors. However, upon the installation of the present invention on the same engine, no freezing was discernible upon switching from heated to unheated fuel and vice versa, and upon dismantling of the fuel injectors after approximately 1500 hours of dual fuel operation, including very numerous switchovers from heated to unheated fuel and vice versa, the plungers of the fuel injector pumps exhibited no discernible scoring whatever.

Figure 4:
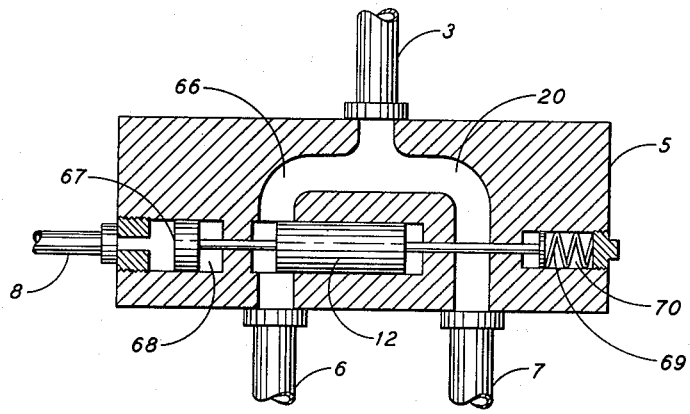
Fig. 4 is an alternative form of proportioning valve for use in the arrangement shown in Fig. 1, whereby the fuel supply to the engine may be changed from distillate fuel only to a mixture of predetermined fixed proportions of residual and distillate fuel.

Referring now to Figures 1 and 4, there is shown in Fig. 4 an alternative form of proportioning valve 5 for use in the arrangement shown in Fig. 1, with component parts numbered to correspond with those of valve 5 in Fig. 1. This alternative form will allow starting of diesel engine 9 on distillate fuel 13 only, and, at a predetermined speed of diesel engine 9, say 25% of full load speed, will operate to automatically change the fuel being supplied to diesel engine 9 from distillate fuel 13 only to a blend of predetermined proportions of distillate fuel 13 and residual fuel 32. In this modification, proportioning valve 5 is so constructed that it may be actuated to accept, for entry into pipe 3, all the fuel arriving at said valve through pipe 6, or, alternatively, none of the fuel so arriving; however, proportioning valve 5 cannot vary the flow of fuel passing therethrough from pipe 7 to pipe 3. The various heaters and pumps in the system are so selected that for given residual and distillate fuels, a mixture of these fuels of predetermined proportions will result in pipe 3 and beyond with piston 12 moved to its extreme position against the pressure of spring 69 in chamber 70. Then, air supply 8 is interlocked as desired with the throttle, governor, or other speed or load responsive component of diesel engine 9 so that at a predetermined speed of diesel engine 9, say 25% of full load speed, piston 12 will move from its position blocking the flow of any residual fuel to diesel engine 9, to its extreme position against the pressure of spring 69 in chamber 70, whereby diesel engine 9 will thereupon become supplied with a fuel mixture of previously determined proportions of residual fuel 32 and distillate fuel 13.

Figure 5:
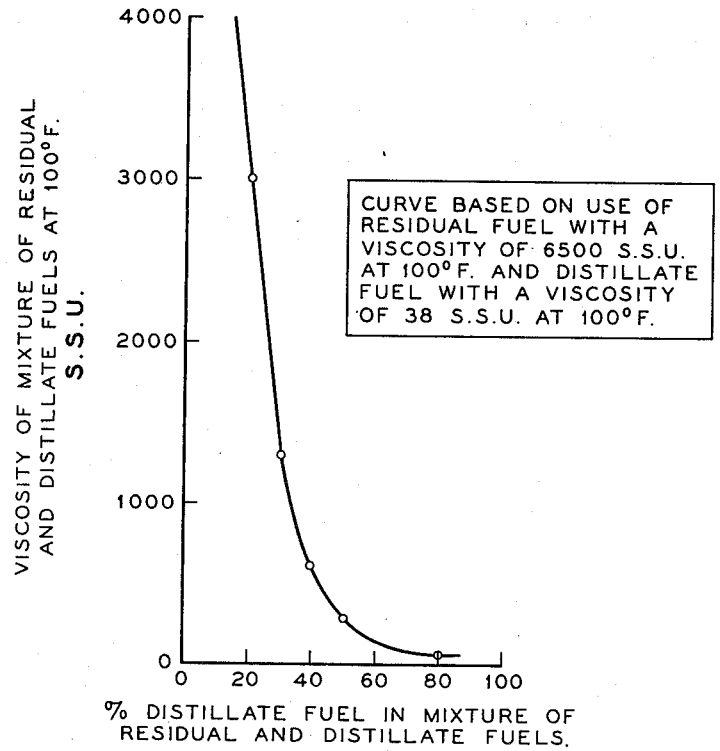
Fig. 5 is a graph illustrating the rapid decrease in viscosity of an exemplary residual-distillate fuel mixture at 100° F. with increase in per cent of distillate fuel contained in the mixture.

Referring now to Fig. 5, the curve there shown illustrates that, in attempting to utilize residual fuel in a diesel engine, great advantages in overcoming the high viscosity effects of the residual fuel can be obtained by a system that will blend distillate fuel with the residual fuel. It will be seen from the curve that the addition of small amounts of distillate fuel to a residual fuel will result in a greatly disproportionate and nonlinear rapid decrease in the viscosity of the mixture. As previously pointed out, the present invention overcomes previous disadvantages of mixing residual and distillate fuels for use in a compression ignition engine and enables the obtaining of the decreased viscosity advantages that the curve of Fig. 5 indicates to be possible. It will be apparent that operation of the present invention can be varied over predetermined ranges of fuel mixture proportions in order to obtain various advantages, for example the minimizing of heating capacity and engine wear, by selecting mixture proportions that will avoid the higher viscosity portions of the curve.

Although only one preferred arrangement and mode of construction and operation has been illustrated and described, it is obvious that this invention could be applied to the use of more than two dissimilar fuels in a compression ignition engine, and that numerous other changes could be made in the arrangements, methods and modes of construction described herein, and all such changes that fall within the scope of the appended claims are intended to be embraced thereby.

I claim:

1. A fuel system for supplying a mixture of two dissimilar fuels to a compression ignition engine, comprising at least one header chamber, means for mixing said fuels into a mixture of predeterminable proportions, means for continuously circulating said mixture through said header chamber, and means for injecting portions of said circulating mixture into said engine.

2. A fuel system for supplying a mixture of two dissimilar fuels to a compression ignition engine, comprising means for heating one of said fuels, means for mixing said fuels into a mixture of predeterminable proportions, at least one header chamber, means for continuously circulating said mixture through said header chamber, and means for injecting portions of said mixture into said engine.

3. A fuel system for supplying two dissimilar fuels to a compression ignition engine comprising means for starting said engine on a first of said fuels, means for adding to the fuel stream of said first fuel being supplied to said engine said second fuel in predetermined proportions, at least one header chamber, means for continuously circulating through said header chamber all fuel being supplied to said engine, and means for injecting portions of said circulating fuel into said engine.

4. A fuel system for supplying two dissimilar fuels to a compression ignition engine comprising at least one header chamber and one pump arranged in a closed loop, means for supplying a first of said two fuels to said closed loop, means for automatically changing the fuel supply to said closed loop from the first to the second of two fuels at a predetermined speed of said engine, and means for injecting into said engine portions of the fuel being circulated around said closed loop by said pump.

5. A fuel system for supplying two dissimilar fuels to a compression ignition engine comprising at least one header chamber and one pump arranged in a closed loop, means for supplying a first of said two fuels to said closed loop, means for automatically changing the fuel supply to said closed loop from the first of said fuels to a mixture comprising predetermined proportions of both of said fuels at a predetermined speed of said engine, and means for injecting into said engine portions of the fuel being circulated around said closed loop by said pump.

6. A fuel system for supplying two dissimilar fuels to a compression ignition engine, comprising at least one header chamber and one pump arranged in a closed loop, means for continuously supplying a first of said fuels to said closed loop, means for heating the second of said fuels, means for mechanically breaking the fuel particles of said second fuel down into particles of smaller size, means for automatically mixing said second fuel with said first fuel being supplied to said closed loop, means responsive to the speed of said engine for varying in any ratio the proportions of the mixture of said second fuel and said first fuel, and means for injecting into said engine portions of said mixture being circulated around said closed loop by said pump.

7. A fuel system for supplying a mixture of two dissimilar fuels to a compression ignition engine, comprising means responsive to the speed of said engine for mixing said fuels into a mixture of predetermined proportions and for varying in any ratio the proportions of said mixture, means for heating one of said fuels prior to mixing, means for causing said mixture to circulate continuously from the time of mixing thereof to the time of burning thereof in said engine, and means for introducing said mixture in desired amounts into the combustion chambers of said engine.

8. A fuel system for supplying two fuels of different viscosities to a compression ignition engine, comprising means for heating the heavier of said fuels, automatic means responsive to the speed of said engine for continuously mixing said fuels into a mixture of predeterminable proportions and for varying in any ratio the proportions of said mixture, closed loop circulating means for continuously circulating said mixture until it is burned by said engine, means for introducing said mixture into said closed loop, a plurality of means for withdrawing from said closed loop and for injecting into the combustion chambers of said engine portions of said mixture being circulated in said closed loop, and manually operable bypass means for preventing mixing of said two fuels and for causing said closed loop to be supplied with the lighter of said two fuels only.

9. The method of operating a compression ignition internal combustion engine on two dissimilar fuels, which comprises the steps of mixing said fuels into a mixture of any desired proportions, establishing a circulating body of said mixture in communication with the fuel injection system of the engine and passing said mixture from said circulating body through said fuel injection system into the engine.

10. The method of operating a compression ignition internal combustion engine on two dissimilar fuels, which comprises the steps of heating one of said fuels, mixing said fuels into a mixture of any desired proportions, continuously circulating said mixture in a piping system until its injection into said engine, injecting desired amounts of said mixture into said engine, and varying the proportions of said fuels in said mixture as required for the speed and load conditions of said engine.

11. The method of operating a compression ignition engine on two dissimilar fuels, which comprises the steps of heating one of said fuels, mechanically breaking down the particles of the heated fuel into particles of smaller size, mixing said fuels into a mixture of any desired proportions, continuously agitating said mixture until its injection into said engine, and injecting desired amounts of said mixture into said engine.

12. The method of operating a compression ignition engine on two dissimilar fuels, which comprises the steps of heating one of said fuels, mechanically breaking down the particles of the heated fuel into particles of smaller size, mixing said fuels into a mixture of any desired proportions of said fuels, continuously agitating said mixture until its injection into said engine, injecting desired amounts of said mixture into said engine, and varying the proportions of mixture as required for the speed and load conditions of said engine.

13. The method of supplying two dissimilar fuels to a compression ignition engine, which comprises the steps of establishing a circulating body of fuel in communication with the fuel injection system of said engine, said circulating body of fuel comprising a mixture of any proportions of said two dissimilar fuels, and varying the proportions of said two dissimilar fuels contained in said mixture as required by the speed and load requirements of said engine.

14. The method of supplying two fuels of different viscosities to a compression ignition engine, which comprises providing a separate supply of each of said two fuels, heating the heavier of said two fuels, mechanically breaking down the particles of the heavier of said two fuels into particles of smaller size, mixing said two fuels into a mixture of any desired proportions of said two fuels, maintaining said mixture in a continuously turbulent condition, automatically introducing quantities of said mixture into the combustion chambers of said engine as required by the load and speed requirements of said engine, and automatically varying the proportions of said two fuels in said mixture in response to speed changes of said engine.

References Cited in the file of this patent

UNITED STATES PATENTS 1,839,878   Huber _____ Jan. 5, 1932